Aug. 13, 1946.　　　A. L. SNEDAKER　　　2,405,720
SLIDE RULE
Filed Aug. 22, 1945　　　2 Sheets-Sheet 1
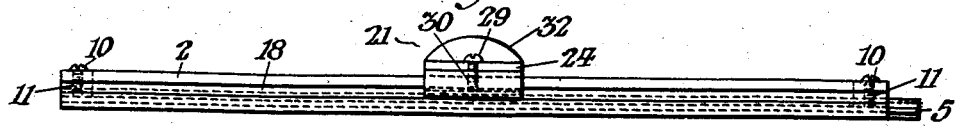
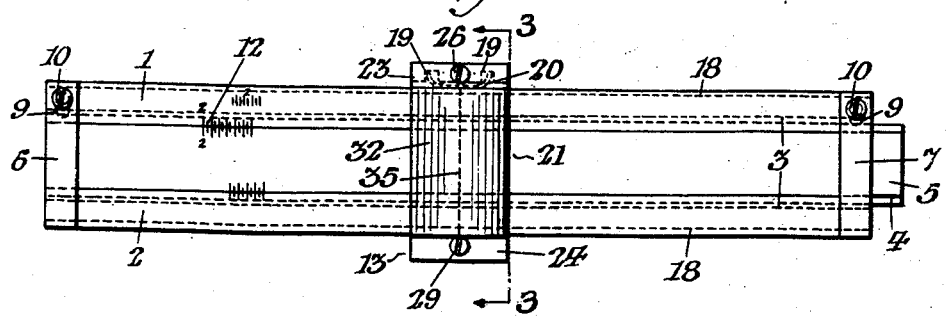
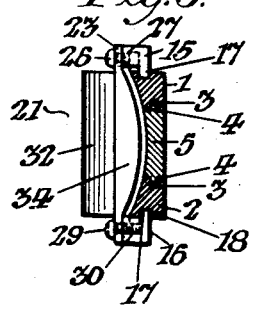
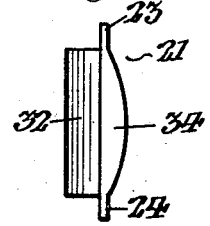
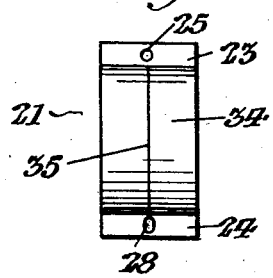
INVENTOR:
Albert L. Snedaker,
BY
ATTORNEY.

Aug. 13, 1946.    A. L. SNEDAKER    2,405,720
SLIDE RULE
Filed Aug. 22, 1945    2 Sheets-Sheet 2
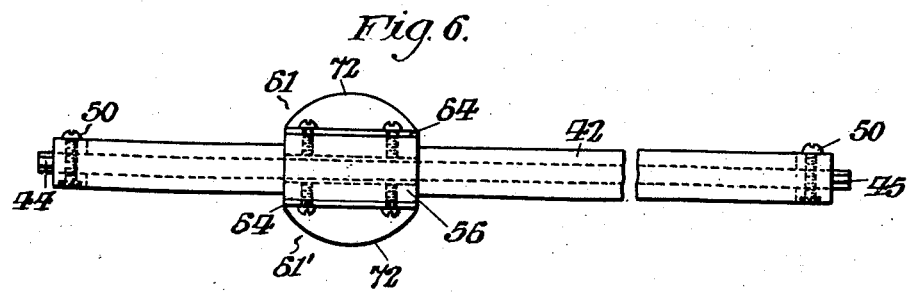
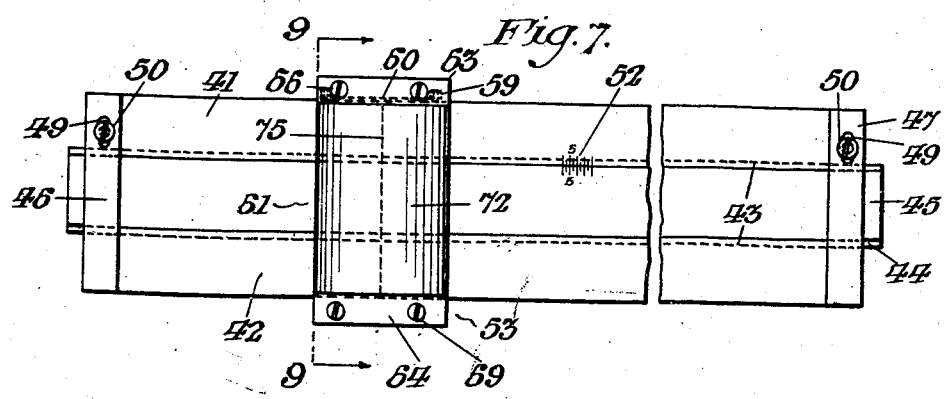
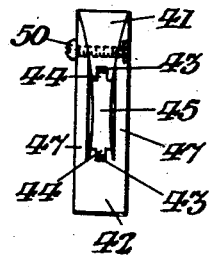
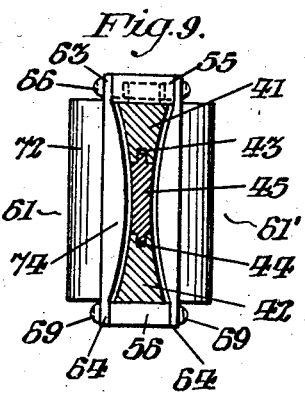
INVENTOR:
Albert L. Snedaker,
BY
ATTORNEY Patented Aug. 13, 1946

2,405,720

UNITED STATES PATENT OFFICE 2,405,720

SLIDE RULE

Albert L. Snedaker, Haddon Heights, N. J.

Application August 22, 1945, Serial No. 611,963

7 Claims. (Cl. 235—70)

My invention relates to improvements in slide rules, and more particularly to built-in magnifying means therefor to enable a user to read more facilely the graduations marked on the slide rule.

The more commonly used sizes of slide rules are the small pocket size which is approximately six inches in length, and the "standard" size which is approximately twelve inches in length. Some of the graduations on slide rules of such lengths are necessarily fine and it is difficult at times to read them. To use an ordinary separate magnifying glass to read such fine graduations is very unsatisfactory because a magnifying glass is not always at hand when wanted, is awkward to use, and is also inconvenient to carry around.

It has long been desired to overcome such difficulties, and many means have been tried. For example, some forms of prior art slide rules have been provided with separate magnifiers consisting of a magnifying lens mounted in a raised frame which is adapted to be detachably secured to the runner of the slide rule. Other forms have a magnifying lens mounted on supporting legs which are pivotally mounted at their lower ends on the runner, so that the lens may be raised for use, or swung out of way against the face of the slide rule when not in use.

Such forms of magnifying means have been found to be more or less objectionable because it is necessary that the lens be positioned at some heighth above the face of the slide rule to assure that the magnifying power of the lens be sufficient to read the graduation markings clearly. Slide rules of the prior art have been made with the body of the rule and the slide formed as a plane surface and the prior art magnifying lens must be positioned about an inch above such plane surface to assure a sufficient magnification of the graduation markings on the slide rule.

One object of my invention is to provide a slide rule with compact magnifying means which are built into and form part of the runner.

Another object of my invention is to provide a slide rule in which the body, or fixed member, of the slide rule is formed as a concavely curved surface.

Another object of my invention is to provide a magnifying lens which has a lower convexly curved surface conforming substantially to the concave curvature of the body portion of the slide rule.

Another object of my invention is to provide a magnifying means formed as a compound lens having an upper cylindrical convex surface formed on an axis substantially at right angles to the axis of the lower cylindrical convex surface.

My invention includes the various novel features of construction and arrangement hereinafter more definitely specified.

In said drawings,

Fig. 1 is a side elevation of a single face slide rule embodying my invention.

Fig. 2 is a plan view of the structure shown in Fig. 1.

Fig. 3 is a vertical sectional view of the structure shown in Figs. 1 and 2, and taken on the line 3—3 in Fig. 2.

Fig. 4 is a side elevation of the magnifying lens indicated in Figs. 1, 2 and 3.

Fig. 5 is an inverted plan view of the lens structure shown in Fig. 2.

Fig. 6 is a side elevation of my invention as embodied in a double-faced rule.

Fig. 7 is a plan view of the structure shown in Fig. 6.

Fig. 8 is an end elevation of the structure shown in Fig. 7.

Fig. 9 is a vertical sectional view taken on the lines 9—9 in Fig. 7.

Referring to the form of my invention shown in Figs. 1 to 5 inclusive; the slide rule includes a body portion, or fixed member, formed of two sections 1 and 2, each longitudinally grooved, as indicated at 3, to receive the corresponding longitudinal flanges 4 of the slide 5. The sections 1 and 2 are maintained in spaced relationship by end members 6 and 7. Each of the members 6 and 7 is conveniently fixed in integral relationship with said section 2. The respective opposite ends of said end members 6 and 7 are provided with an elongated opening 9 through which respective screws 10 extend into screw threaded engagement in the screw threaded openings 11 formed at the opposite ends of said section 1.

As best shown in Fig. 3, the upper surfaces of the sections 1 and 2 and slide 5 are formed as a concave surface. Although one surface of the slide 5 is shown in Fig. 3 as a concave surface, the slide 5 may be formed with plane surfaces without affecting the functioning of my improved magnifying means as hereinafter described. Each of the sections 1 and 2 and slide 5 is provided with a series of longitudinal graduations in the usual manner, as indicated at 12, although only a small portion of such graduations is shown for convenience and to avoid confusion in the drawings.

The runner, generally indicated at 13, is comprised of the oppositely counterpart members 15 and 16 respectively embracing the sections 1 and 2. Each of said members 15 and 16 is provided with the usual sliding tongue portion 17 for sliding engagement in the longitudinal grooves 18 formed in said sections 1 and 2. The member 15 is provided with spaced recesses 19 in which are engaged the respective opposite loose ends of the spring 20. Said spring 20 frictionally engages the outer edge of the member 1, as best indicated in Fig. 2, to maintain said runner 13 in proper sliding relationship with the sections 1 and 2.

The magnifying lens, generally indicated at 21, forms part of the runner and said lens is provided with the oppositely extending flange portions 23 and 24. The flange 23 is provided with the opening 25 through which the screw 26 extends into screw threaded engagement with the matching screw threaded opening 27 formed in said member 15. The flange member 24 is provided with the opening 28 through which the screw 29 extends into screw threaded engagement with the matching screw threaded opening 30 formed in the member 16. The lens 21 may be formed from glass, plastic, lucite, or any of the well known transparent materials.

The magnifying lens 21 is formed conveniently as a compound lens including an upper cylindrical convex surface portion 32 formed on an axis substantially at right angles to the axis of the lower cylindrical convex surface portion 34. As best shown in Fig. 3, the lower cylindrical convex surface 34 is formed with a curvature substantially the same as the curvature of the concave surface of the slide rule, but the lens 21 is so mounted that the surface 34 is maintained out of contact and in spaced relation with the concave surface of the rule.

As best shown in Figs. 2 and 5, the surface 34 is provided with the fine hairline 35 to indicate precisely in the usual manner the fractional graduation desired.

In Figs. 6 to 9, inclusive, I have shown my invention incorporated in a double faced slide rule. Referring to Figs. 6 to 9, the slide rule includes a body portion, or fixed member, formed of two sections 41 and 42, each longitudinally grooved, as indicated at 43, to receive the corresponding longitudinal flanges 44 of the slide 45. The sections 41 and 42 are maintained in spaced relationship by the bifurcated end members 46 and 47, of the section 42, which engage within their bifurcated arms the opposite ends of the section 41. Each of the members 46 and 47 is conveniently formed in integral relationship with said section 42. The upper portions of said bifurcated end members 46 and 47 are provided respectively with elongated openings 49 through which respective screws 50 extend through matching openings in the section 41 into screw threaded engagement in the matching openings formed in the underlying arm.

As best shown in Fig. 9, the opposite outer graduated surfaces of the sections 41 and 42 and slide 45 are formed as concave surfaces. Although the surfaces of the slide 45 are shown in Fig. 9 as concave surfaces, the slide 45 may be formed with plane surfaces without affecting the functioning of my improved magnifying means as hereinafter described.

Each of the sections 41 and 42 and slide 45 is provided with a series of longitudinal graduations in the usual manner, as indicated at 52, although only a small portion of such graduations is shown for convenience.

The runner, generally indicated at 53, is comprised of the opposite members 55 and 56 respectively embracing the sections 41 and 42. Although said members 55 and 56 are shown in sliding engagement with an ungrooved edge surface of the members 41 and 42, it is obvious that said members 55 and 56 may be provided with a sliding tongue portion for sliding engagement in a groove formed in the sections 41 and 42 in the same manner as heretofore described with reference to the form of my invention shown in Figs. 1 to 5 inclusive.

The member 55 is provided with spaced recesses 59 in which are engaged the respective opposite loose ends of the spring 60. Said spring 60 frictionally engages the edge surface of the member 41, as best indicated in Fig. 7, to maintain said runner 53 in proper sliding relationship with the sections 41 and 42.

The magnifying lenses, generally indicated at 61 and 61', form part of the runner and are identical in construction but assembled in oppositely counterpart position. Each of the lenses 61 and 61' is provided with oppositely extending flange portions 63 and 64. The flanges 63 are provided with openings through which screws 66 extend into screw threaded engagement with matching screw threaded openings formed in said member 55, and the flanges 64 are provided with openings through which the screws 69 extend into screw threaded engagement with the matching screw threaded openings formed in the member 56. The lenses 61 and 61' may be formed of any of the well known transparent materials, as has been hereinabove stated with reference to the lens 21 of the form of my invention shown in Figs. 1 to 5 inclusive.

The lenses 61 and 61' being identical, only the lens 61 will be described. Said lens 61 is formed as a compound lens including an upper cylindrical convex surface portion 72 formed on an axis substantially at right angles to the axis of the lower cylindrical convex surface portion 74. As best shown in Fig. 9, the lower cylindrical convex surface 74 is formed with substantially the same curvature as the curvature of the concave surface of the slide rule, but the lens 61 is so mounted that the surface 74 is maintained out of contact and in spaced relation with the concave surface of the rule. As best indicated in Fig. 7 with reference to the lens 61, the respective surfaces 74 of the lenses 61 and 61' are provided with the fine hairline 75 to indicate precisely the fractional graduation desired.

It is obvious that various modifications may be made in my invention without departing from the essential features thereof as defined in the appended claims and, therefore, I do not desire to limit myself to the precise details of construction and arrangement hereinbefore set forth.

I claim:

1. A slide rule comprising a body portion having a concavely curved face; and a convexly curved lens slidably mounted on said body portion with the convexly curved surface of said lens in substantially concentric close juxtaposition to said concavely curved face.

2. A slide rule comprising a body portion having a concavely curved face; a slide member having a concavely curved face; and a convexly curved lens slidably mounted on said body portion with the convexly curved surface of said lens in substantially concentric close juxtaposition to said concavely curved faces of said body portion and said slide.

3. A slide rule comprising a body portion having a concavely curved face, and a convexly curved cylindrical section lens slidably mounted on said body portion with the convexly curved surface of said lens in substantially concentric close juxtaposition to said concavely curved face.

4. A slide rule comprising a body portion having a concavely curved face; a slide member having a concavely curved face; and a convexly curved cylindrical section lens slidably mounted on said body portion with the convexly curved surface of said lens in substantially concentric close juxtaposition to said concavely curved faces of said body portion and said slide.

5. A slide rule as in claim 1; wherein said lens is formed as a compound lens having an upper convexly curved cylindrical section portion formed on an axis which is substantially at right angles to the axis of said first mentioned convexly curved surface.

6. A slide rule as in claim 2; wherein said lens is formed as a compound lens having an upper convexly curved cylindrical section portion formed on an axis which is substantially at right angles to the axis of said first mentioned convexly curved surface.

7. A slide rule as in claim 3; wherein said lens is formed as a compound lens having an upper convexly curved cylindrical section portion formed on an axis which is substantially at right angles to the axis of said first mentioned convexly curved cylindrical section portion.

ALBERT L. SNEDAKER.